United States Patent [19]

Morgavo

[11] Patent Number: 4,645,315

[45] Date of Patent: Feb. 24, 1987

[54] TRAILING DISTANCE AND SAFE PASSING INDICATOR FOR TRAILER

[76] Inventor: Joseph Morgavo, 520 E. 8th Ave., Munhall, Pa. 15120

[21] Appl. No.: 798,581

[22] Filed: Nov. 15, 1985

[51] Int. Cl.$^4$ .......................... G02B 5/08; G01C 3/00
[52] U.S. Cl. ...................................... 350/600; 33/264
[58] Field of Search ...................... 350/600, 601, 605; 356/3; 33/264, 277

[56] References Cited

U.S. PATENT DOCUMENTS

| | | | |
|---|---|---|---|
| 1,311,253 | 7/1919 | Stern | 350/600 X |
| 2,200,168 | 5/1940 | Goldberg | 350/600 X |
| 2,871,754 | 2/1959 | Marble | 350/600 |
| 3,772,795 | 11/1973 | Calvert | 356/3 X |
| 4,023,029 | 5/1977 | Fischer | 350/600 |

*Primary Examiner*—Donald Watkins
*Attorney, Agent, or Firm*—William J. Ruano

[57] ABSTRACT

A device mounted on the right rear of a trailer driven by a motor vehicle to denote when it is safe to move back into the normal driving lane of a highway, after passing a vehicle and while in the passing lane. The device is a transparent reflector mounted on the right rear of the trailer and which is illuminated by the passed vehicle when falling behind the trailer. By means of a right view mirror on the driving motor vehicle, the driver of the vehicle which pulls the trailer will know from the sudden appearance of light reflected on his rearview mirror, from the transparent reflector, that it is safe to move from the passing lane to the driving lane. A modification, particularly useful in the daytime, is a calibrated, sideview mirror on the driving vehicle which gives a visual indication of how far to the rear of the trailer the passed vehicle is located. This will indicate when it is safe to move back into the normal driving lane.

2 Claims, 3 Drawing Figures

TRAILING DISTANCE AND SAFE PASSING INDICATOR FOR TRAILER

This invention relates to a safety device useful to assure when it is safe for a vehicle, towing a trailer, to move from the passing lane to the driving lane after overtaking another vehicle.

In the past, no reliable safety device has been used for the above purpose,—that is, when a vehicle pulling a tailer would pass up a slow moving car, the driver of the vehicle towing the trailer could never decide when it was safe to move from the passing lane to the driving lane without the danger of running into the overtaken vehicle.

The following statement of the prior art is filed pursuant to 37 C.F.R. 1.97 and 1.98 representing the most pertinent prior art of which applicant is aware. In accordance with 37 C.F.R. 1.98(b), photocopies of the patents listed below are appended hereto:

| Patent No. | Name |
| --- | --- |
| 2,871,754 | Rearview Mirror Attachment |
| 2,738,753 | Speed and Range Indicator for Motor Vehicles |
| 2,200,168 | Reflector Device for Indicating Position of a Car |
| 2,091,028 | Indicator Device |
| 1,879,592 | Distance Indicator for Vehicles |
| 1,311,253 | Distance Indicator |
| 4,257,706 | Motor Vehicle Back-Up Limit Gauging Method and Apparatus |
| 4,023,029 | Distance Indicating Mirror Dev. |
| 3,893,068 | Trailer Back-Up-Right Device |
| 3,863,594 | Boat Trailer Backup Guide |
| 3,772,795 | Range, Trailing Distance and Safe Passing Indicator for Motor Vehicle Operators |
| 3,698,798 | Rear View Mirror for Auto Bumpers |
| 3,521,234 | Motor Vehicle Mirror Tailgating Observation and Warning Sys. |

An object of the present invention is to provide a novel device and arrangement of it to overcome the above-named disadvantages.

Other objects and advantages of the invention will become more apparent from a study of the following description taken with the accompanying drawing wherein.

Figure 1:
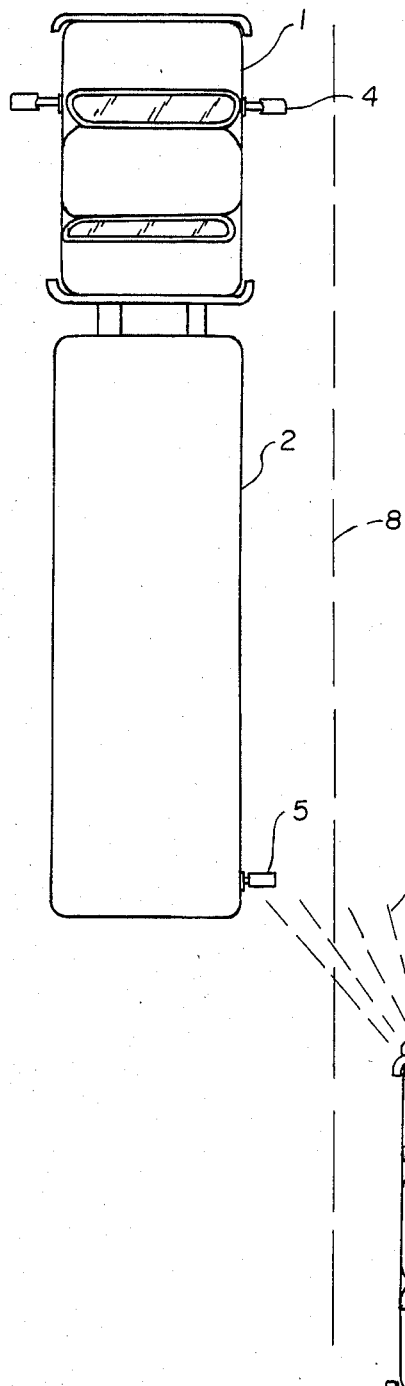
FIG. 1 shows a motor vehicle pulling a trailer equipped with a transparent reflector positioned in accordance with the present invention and illustrating the vehicle and trailer in the passing lane just before it is safe to pull back into the driving lane.
Figure 2:
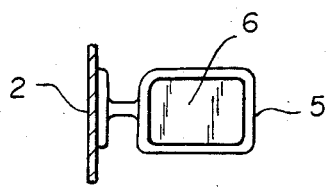
FIG. 2 shows one form of transparent reflector for attachment to the right rear of the trailer.

Referring more particularly to FIGS. 1 and 2 of the drawing, numeral 1 denotes a driving vehicle having a sideview mirror 4 and numeral 2 denotes a trailer towed by vehicle 1, having on the right rear thereof a transparent reflector 4. Numeral 3 denotes the vehicle passed up or overtaken.

In operation, when the vehicle 1 and trailer 2 have passed up or overtaken a slower moving vehicle 3 at night time, the driver will look at his sideview mirror 4 to see when it will show the reflection of the light beam 7 from the vehicle 3 that has just been overtaken. This occurs when the overtaken vehicle 3 is beyond the rear of the trailer sufficiently such that its headlight will illuminate the transparent reflector 5, whereupon the reflector thereof will be instantly seen by the operator through his sideview mirror 4. At this time, the driver can feel safe to pull back into the driving lane without fear of running his trailer into the vehicle being overtaken.

FIG. 2 shows the transparent reflector 5 which may be of any construction, such as perforated or even imperforated as in FIG. 2, so long as it is transparent to the light from the headlights of the overtaking vehicle 3.

Figure 3:
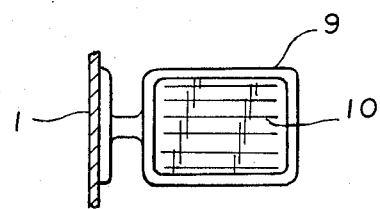
FIG. 3 shows a modification of a sideview mirror of the driving vehicle which is useful especially during the daytime.

FIG. 3 shows a modification of the invention, particularly useful during the daytime, wherein instead of a plain mirror on the sideview mirror 5, there are inscribed horizontal lines 10 which are calibrated such that when the reflection of a vehicle being passed up is observed as showing the vehicle as being between the two or more lines, depending upon the calibrated distance behind at which the overtaken vehicle 3 appears, that is, the length of the trailer. At night, the greater the distance behind, the lower the headlights move on the mirror. Thus the driver knows that the overtaken vehicle is sufficiently behind the trailer so that it is safe for the driver to pull back into the driving lane from the passing lane. Such mirror 10 can be used alone or in combination with transparent reflector 5.

Thus it will be seen that I have provided a novel safety device and its arrangement on a trailer to insure when it is safe, after passing up of a slow moving vehicle, to move back into the driving lane without the danger of colliding with the overtaken vehicle,—and which device is very inexpensive to install and maintain.

While I have illustrated and described several embodiments of my invention, it will be understood that these are by way of illustration only and that various changes and modifications may be contemplated in my invention and within the scope of the following claims.

I claim:

1. In combination with an automotive vehicle having a sideview mirror mounted on the right side thereof, alongside the driver, and having a trailer towed by the vehicle; the improvement for night time driving comprising a transparent reflector mounted outwardly of the right rear of said trailer, whereby the headlights of the overtaken vehicle will shine through said reflector and be observed by said right view mirror to indicate when it is safe to move from the passing lane to the driving lane.

2. A device as recited in claim 1 wherein said right view mirror is calibrated by spaced horizontal lines, for also day time driving to denote the distance behind the trailer of the overtaken vehicle.

* * * * *